United States Patent
Nolan et al.

(10) Patent No.: US 10,620,748 B2
(45) Date of Patent: Apr. 14, 2020

(54) METHOD AND DEVICE FOR PROVIDING A TOUCH-BASED USER INTERFACE

(71) Applicant: Telefonaktiebolaget L M Ericsson (publ), Stockholm (SE)

(72) Inventors: Julian Charles Nolan, Pully (CH); Matthew John Lawrenson, Bussigny (CH); Till Burkert, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/655,865

(22) PCT Filed: Oct. 22, 2014

(86) PCT No.: PCT/SE2014/051241
§ 371 (c)(1),
(2) Date: Jun. 26, 2015

(87) PCT Pub. No.: WO2016/064311
PCT Pub. Date: Apr. 28, 2016

(65) Prior Publication Data
US 2016/0216837 A1    Jul. 28, 2016

(51) Int. Cl.
*G06F 3/042*    (2006.01)
*G06F 3/041*    (2006.01)
(Continued)

(52) U.S. Cl.
CPC ............ *G06F 3/0418* (2013.01); *G06F 3/005* (2013.01); *G06F 3/017* (2013.01); *G06F 3/0425* (2013.01);
(Continued)

(58) Field of Classification Search
CPC ........ G06F 3/042; G06F 3/005; G06F 3/0425; G06F 2203/04106; G06F 3/0418; G06F 3/04883; G06F 3/017; G06F 3/04886
(Continued)

(56) References Cited

U.S. PATENT DOCUMENTS 8,073,198 B2 * 12/2011 Marti .................. G06F 3/011
    345/156
8,947,351 B1 * 2/2015 Noble .................. G06F 3/0488
    345/156
(Continued)

OTHER PUBLICATIONS

Nishino et al., "Eyes for Relighting", *ACM Transactions on Graphics (TOG)—Proceedings of ACM SIGGRAPH 2004*, vol. 23, No. 3, Aug. 2004, pp. 704-711.
(Continued)

*Primary Examiner* — Jeff Piziali
(74) *Attorney, Agent, or Firm* — Sage Patent Group (57) ABSTRACT

A device for providing a touch-based user interface is disclosed. The device comprises a screen, a camera, and processor. The camera images a reflection of the screen by a cornea of a user of the device. The processor displays at least one user-interface element on the screen, detects that a finger of a hand touches or is about to touch the screen, estimates a trajectory of the finger, and determines an intended location of touch of the finger on the screen. The trajectory of the finger is estimated by analyzing a sequence of images of the reflection. The intended location of touch is determined based on the estimated trajectory of the finger.

10 Claims, 9 Drawing Sheets

(51) Int. Cl.
*G06F 3/0488* (2013.01)
*G06F 3/00* (2006.01)
*G06F 3/01* (2006.01)

(52) U.S. Cl.
CPC ...... *G06F 3/04883* (2013.01); *G06F 3/04886* (2013.01); *G06F 2203/04106* (2013.01)

(58) Field of Classification Search
USPC .......................................................... 345/175
See application file for complete search history.

(56) References Cited

U.S. PATENT DOCUMENTS

| | | | | |
|---|---|---|---|---|
| 2009/0296988 | A1* | 12/2009 | Yamazaki | G06F 3/013 382/103 |
| 2010/0125816 | A1* | 5/2010 | Bezos | G06F 1/1626 715/863 |
| 2012/0036433 | A1* | 2/2012 | Zimmer | G06T 15/20 715/702 |
| 2013/0283208 | A1* | 10/2013 | Bychkov | G06F 3/017 715/810 |
| 2013/0295994 | A1* | 11/2013 | Guitteaud | F16M 13/00 455/556.1 |
| 2014/0085342 | A1* | 3/2014 | Shoemaker | G06K 9/00355 345/672 |
| 2014/0196143 | A1* | 7/2014 | Fliderman | G06F 21/32 726/19 |
| 2014/0282269 | A1* | 9/2014 | Strutt | G06F 3/04883 715/863 |
| 2015/0160461 | A1* | 6/2015 | Starner | G06F 3/013 345/156 |
| 2016/0253044 | A1* | 9/2016 | Katz | G06F 3/017 |

OTHER PUBLICATIONS

Nitschke et al., "Super-Resolution from Corneal Images", *23rd British Machine Vision Conference (BMVC)*, Sep. 2012, pp. 1-12.
International Search Report, Application No. PCT/SE2014/051241, dated Jun. 26, 2015.
Written Opinion of the International Searching Authority, Application No. PCT/SE2014/051241, dated Jun. 26, 2015.
Nitschke et al., "Corneal Imaging Revisited: An Overview of Corneal Reflection Analysis and Applications", *IPSJ Transactions on Computer Vision and Applications*, vol. 5, Jan. 2013, pp. 1-18.

* cited by examiner

METHOD AND DEVICE FOR PROVIDING A TOUCH-BASED USER INTERFACE

CROSS REFERENCE TO RELATED APPLICATION

This application is a 35 U.S.C. § 371 national stage application of PCT International Application No. PCT/SE2014/051241, filed on 22 Oct. 2014, the disclosure and content of which is incorporated by reference herein in its entirety.

TECHNICAL FIELD

The invention relates to a device for providing a touch-based user interface, a method of providing a touch-based user interface, a corresponding computer program, and a corresponding computer program product.

BACKGROUND

Devices incorporating touchscreens have become increasingly popular owing to the increased flexibility offered by touch-based user interfaces over physical keyboards. In particular, this is the case for hand-held computing devices such as smartphones, tablet computers or simply tablets, portable media players, and the like.

A touchscreen is an electronic visual display which provides graphical information to a user and allows the user to input information to the device, or to control the device, by single touches or gestures made by touching the touchscreen. Various types of touchscreen are known, such as resistive touchscreens, surface acoustic wave touchscreens, and capacitive touchscreens.

The use of touchscreen-based devices, in particular hand-held devices, is intrinsically limited by the size of 'interaction-space' available to the user, i.e., the size of the touchscreen. This is the case since many users have fingers which are comparatively large in comparison to the virtual buttons which typically are presented to users of such devices. For instance, when using a virtual keyboard for entering or editing text, users often hit a key which is adjacent to the key they intended to touch.

A known solution for improving the usability of virtual keyboards is to arrange the keys on a number of separate layers between which the user may switch by means of modifier keys, thereby increasing the size of the virtual keys. However, due to the small size of touchscreens incorporated in mobile devices, in particular smartphones, the size of virtual keys is nevertheless limited, and they are typically smaller than their physical equivalents on a conventional keyboard. As a consequence, selecting the correct key may be more difficult for users, and operation of such devices is overly intricate, complex, slow, and confusing.

SUMMARY

It is an object of the invention to provide an improved alternative to the above techniques and prior art.

More specifically, it is an object of the invention to provide an improved touch-based user interface, and in particular an improved solution for entering information using virtual keyboards.

These and other objects of the invention are achieved by means of different aspects of the invention, as defined by the independent claims. Embodiments of the invention are characterized by the dependent claims.

According to a first aspect of the invention, a device for providing a touch-based user interface is provided. The device comprises a screen, a camera, and processing means. The camera is configured for imaging a reflection of the screen by a cornea of a user of the device. The processing means is operative to display at least one user-interface element on the screen, detect that a finger of a hand touches or is about to touch the screen, estimate a trajectory of the finger, and determine an intended location of touch of the finger on the screen. The trajectory of the finger is estimated by analyzing a sequence of images of the reflection. The intended location of touch of the finger on the screen is determined based on the estimated trajectory of the finger.

According to a second aspect of the invention, a method of providing a touch-based user interface is provided. The method comprises displaying at least one user-interface element on a screen, detecting that a finger of a hand touches or is about to touch the screen, estimating a trajectory of the finger, and determining an intended location of touch of the finger on the screen. The trajectory of the finger is estimated by analyzing a sequence of images of a reflection of the screen by a cornea of a user. The intended location of touch of the finger on the screen is determined based on the estimated trajectory of the finger.

According to a third aspect of the invention, a computer program is provided. The computer program comprises computer-executable instructions for causing a device to perform the method according to an embodiment of the second aspect of the invention, when the computer-executable instructions are executed on a processing unit comprised in the device.

According to a fourth aspect of the invention, a computer program product is provided. The computer program product comprises a computer-readable storage medium which has the computer program according to the third aspect of the invention embodied therein.

The invention makes use of an understanding that an improved touch-based user interface can be achieved by utilizing a top-down view of the user's finger as it interacts with the screen. This is particularly advantageous for hand-held devices, such as smartphones, tablets, or mobile terminals, which typically are equipped with comparatively small screens. Based on the top-down view, which is obtained by means of corneal imaging, the location at which the user intended to touch the screen can be determined. Embodiments of the invention utilize a camera which has a field of view which is directed into substantially the same direction as the viewing direction of the screen. Preferably, the camera and the touchscreen are provided on the same face of the device, such as a front-facing camera of a type which is frequently provided with hand-held devices such as tablets and smartphones.

Corneal imaging is a technique which utilizes a camera for imaging a person's cornea, e.g., that of the user of the device, for gathering information about what is in front of the person and also, owing to the spherical nature of the human eyeball, for gathering information about objects in a field-of-view which is wider than the person's viewing field-of-view. Such objects may potentially be outside the camera's field-of-view and even be located behind the camera. The technique is made possible due to the highly reflective nature of the human cornea, and also the availability of high-definition cameras in devices such as smartphones and tablets.

The intended location of touch of the finger, or rather the tip of the finger, on the screen is determined based on an estimated trajectory of the finger and is preferably expressed in terms of a frame of reference of the screen. Thereby, a relation between the intended location of touch and one or more displayed user-interface elements may be established. The intended location of touch may, e.g., be calculated as the location of interception between the estimated trajectory and an outer surface of the screen.

According to an embodiment of the invention, the processing means is operative to estimate the trajectory of the finger by determining a past trajectory of the finger and projecting a future trajectory of the finger towards the screen. The past trajectory of the finger is estimated by analyzing the sequence of images, e.g., by determining a location of the finger, and/or a location of the fingertip and optionally the hand, as a function of time. In general, this may be accomplished by determining a respective location of a plurality of characteristic points of one or more fingers and/or the hand. The future trajectory is projected based on the determined past trajectory of the finger. This may, e.g., be achieved based on a model for the trajectory which is derived by analyzing trajectories of a population, the user, or a group of users. Such a model of the trajectory may reflect the anatomy of the human hand, fingers, and arm, as well as their motion. The model may be derived by analyzing, either regularly or during a learning phase, typing actions of one or more users captured by means of corneal imaging.

According to an embodiment of the invention, the processing means is operative to continuously acquire images of the reflection. The images are acquired from the camera. The processing means is further operative to detect that the finger touches or is about to touch the screen by analyzing the images, i.e., by means of image processing. In this way, embodiments of the invention can detect that the finger is about to touch the screen earlier than what may be achieved using conventional touchscreens, such as resistive touchscreens, surface acoustic wave touchscreens, and capacitive touchscreens. Moreover, embodiments of the invention may utilize screens of non-touchscreen type for providing a touch-based user interface to users of the device. This is achieved by detecting the touch, and determining its location on the screen, based on corneal imaging. Advantageously, the complexity of the screen may be reduced, resulting in lower manufacturing costs.

According to an embodiment of the invention, the screen is a touchscreen. The touchscreen is configured for detecting that the finger touches or is about to touch the touchscreen. Thus, the processing means may be operative to detect that the finger touches or is about to touch the touchscreen either in response to receiving an indication, e.g., a signal, from the touchscreen, upon the touchscreen detecting that the finger touches or is about to touch the touchscreen, by means of analyzing the sequence of images as described hereinbefore, or a combination thereof. The touchscreen is further configured for determining a location where the finger touches or is about to touch the touchscreen, and the processing means is operative to determine the intended location of touch further based on the location determined by the touchscreen. By determining the intended location of touch determined based on analyzing the sequence of images capturing the motion of the finger prior to the touch, i.e., the estimated trajectory of the finger, in combination with the location of touch determined by the touchscreen, the tolerance to finger-placement inaccuracy, which in particular is inherent to handheld-devices, is improved. This is advantageous since many user-interface elements which are presented to users of touchscreen-based devices, such as keys on a virtual keyboard, links on a webpage, or words in a piece of text, are rather small in relation to the touching finger. Thereby, the problem of touching the wrong key, link, or word, which users of touchscreen-based devices experience, may be mitigated.

According to an embodiment of the invention, the processing means is operative to display a plurality of user-interface elements on the screen and determine an intended user-interface element of the plurality of user-interface elements. The intended user-interface element is determined based on the intended location of touch. In the present context, the intended user-interface element is the user-interface element, e.g., a key on a virtual keyboard, which the user intended to touch. In practice, this may be the user-interface element which has a surface area closest to the intended location of touch.

According to an embodiment of the invention, the processing means is further operative to modify one or more of the at least one user-interface element in response to detecting that the finger touches or is about to touch the screen. The one or more modified user-interface elements may be close to the intended location of touch, e.g., the intended user-interface element. Alternatively, the one or more modified user-interface elements may be close to the estimated trajectory. For instance, the processing means may be operative to modify the one or more or user-interface elements by magnifying the one or more user-interface elements. Alternatively, the processing means may be operative to modify the one or more or user-interface elements by changing a visual appearance of the one or more user-interface elements. This is advantageous in that, based on detecting that the finger is about to touch the screen and the estimated intended location of touch, but prior to the finger actually touching the screen, visual feedback can be provided to the user. Thereby, the user may correct the trajectory of his/her finger in case he/she foresees that a wrong user-interface element is about to be touched, or that the screen is touched at a wrong location, e.g., when editing text. If one or more user-interface elements close to the estimated trajectory are modified, e.g., by magnifying a number of keys or a virtual keyboard along the estimated trajectory, the provided visual feedback supports the user in touching the intended key among the plurality of magnified keys along the estimated trajectory.

According to an embodiment of the invention, the processing means is further operative to performing an action in response to determining the intended location of touch, and in particular in response to determining the intended user-interface element. The action is associated with touching the screen at the intended location of touch, such as touching or pressing a virtual button or link, or moving a cursor to the intended location of touch.

According to an embodiment of the invention, the processing means is further operative to correct and/or predict a typed word based on the estimated trajectory and/or the intended location of touch. Advantageously, text correction functionality for entering and editing text, known as Autocorrect, replace-as-you-type, or text replacement, may thereby be enhanced. This may be achieved by taking into account the estimated trajectory of the finger and/or the intended location of touch, in addition to suggesting one or more likely words from a dictionary.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Figure 1A:
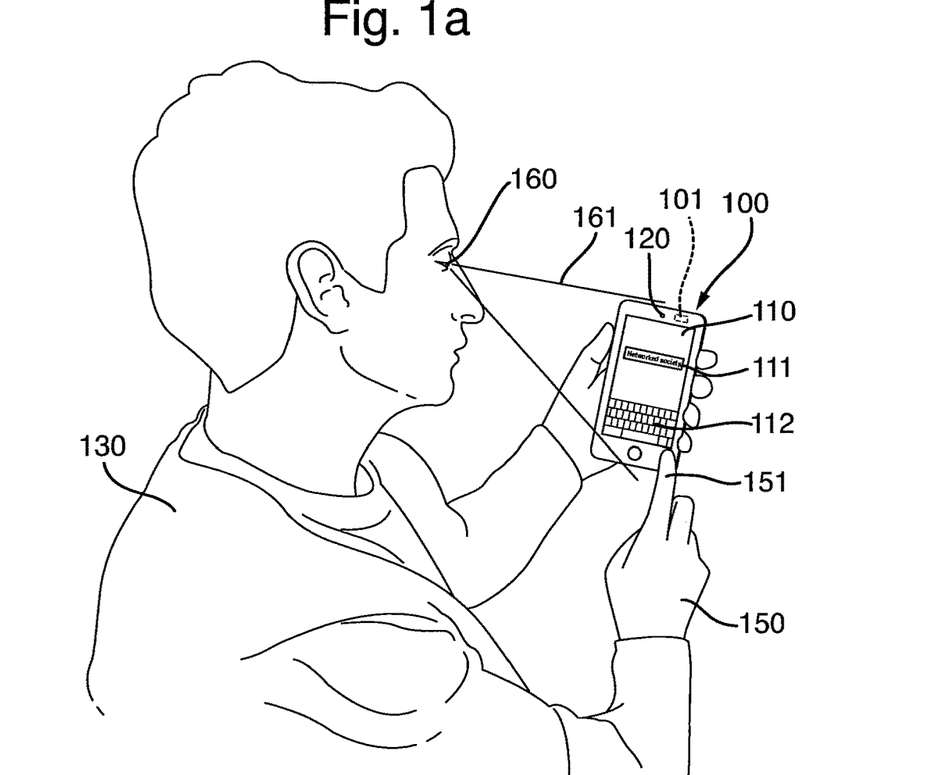
FIGS. 1a and 1b illustrate interaction by a user with a device providing a touch-based user interface, in accordance with an embodiment of the invention.

In FIG. 1a, a device 100 is shown, in accordance with an embodiment of the invention. Device 100, in FIG. 1a illustrated as a smartphone, comprises processing means 101, a screen 110, and a camera 120. Screen 110 is operable as output device for device 100, i.e., for displaying graphical content such as user-interface elements, e.g., virtual buttons or keys, pictures, pieces of text, fields for entering or editing text, Uniform Resource Locators (URLs) or other links, and the like. Screen 110 and the graphical objects displayed on it are controlled by processing means 101, e.g., an operating system or application being executed on processing means 101. Screen 110 may be a conventional screen of non-touchscreen type or a touchscreen, such as a resistive touchscreen, a surface acoustic wave touchscreen, or a capacitive touchscreen, as is discussed further below.

Figure 1B:
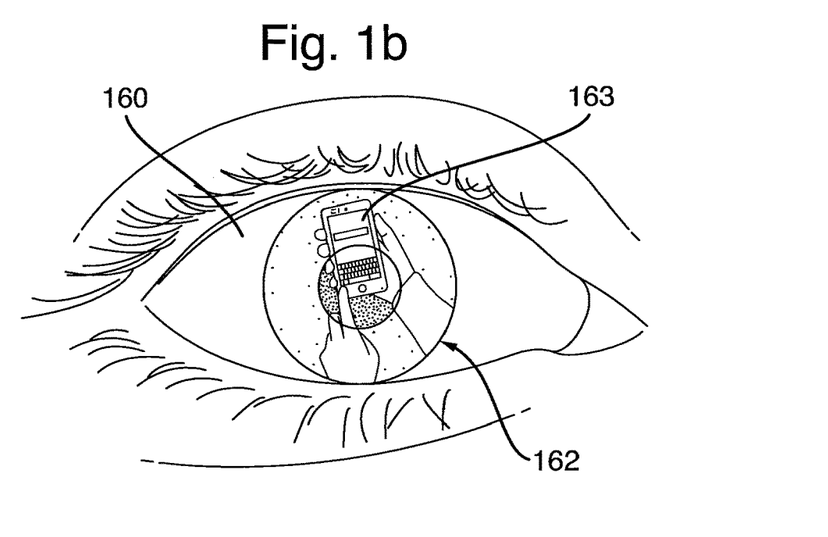

Camera 120 has a field of view which is directed into the same direction as the viewing direction of screen 110. Camera 120 and screen 110 are preferably provided on the same face of device 100, i.e., camera 120 is a front-facing camera. Optionally, device 100 may comprise multiple front-facing cameras and also a rear-facing camera. Camera 120 is configured for imaging a reflection 163 of screen 110 by a cornea 162 of an eye 160 of user 130, as is illustrated in FIG. 1b. Note that, in general, light is mostly reflected by the cornea of the human eye, and that it is easier to detect reflections in the dark region of the iris as compared to the white sclera surrounding the iris. To this end, embodiments of the invention utilize camera 120 for capturing a top-down view of finger 151 touching screen 110 and determining an intended location of touch, as is described further below.

The technique of corneal imaging is made possible by the spherical nature of the human eyeball allowing gathering information about objects in a field of view 161 which may be wider than user 130's viewing field-of-view. Optionally, embodiments of the invention may utilize both corneas of user 130, and even corneas of different users which are in the field-of-view of camera 120, allowing stereoscopic corneal imaging. Thereby depth information may be obtained, e.g., the distance between finger 151 and screen 110. It will be appreciated that reflection 163 may optionally arise from a contact lens placed on the surface of eye 160, or even from eyeglasses or spectacles worn in front of eye 160 (not shown in FIGS. 1a and 1b).

Throughout this disclosure, a user of a device is understood to be a person located so as to be able to operate the device, e.g., holding the device, sitting in front of a table on which the device is placed, or sitting next to a person holding the device. It is further to be understood that the user can control the device and/or enter information by touching user-interface elements displayed on a screen of the device, i.e., by means of a touch-based user interface provided by the device.

Processing means 101, and thereby device 100, is operative to display at least one user-interface element on screen 110. In FIG. 1a, screen 110 is illustrated as displaying a text field 111, for entering or editing text, and a virtual keyboard 112 which is operable as input device for device 100, allowing user 130 to enter information and to control the operation of device 100 by touching screen 110. In particular, user 130 may use virtual keyboard 112 for typing text into text field 111 or editing text displayed in text field 111.

Processing means 101 is further operative to detect that a finger of a hand, e.g., finger 151 of hand 150, touches or is about to touch screen 110. For instance, processing means 101 may be operative to continuously acquire images of reflection 163 from camera 120 and detect that finger 151 touches or is about to touch screen 110 by analyzing the images. This may, e.g., be accomplished by analyzing a sequence of images which capture a motion of hand 150 and finger 151 towards screen 110. Alternatively, screen 110 may be a touchscreen, such as a resistive touchscreen, a surface acoustic wave touchscreen, or a capacitive touchscreen, which is configured for detecting that finger 151 touches or is about to touch touchscreen 110 and sending an indication, such as a message, to processing means 101, as is discussed further below.

Figure 2:
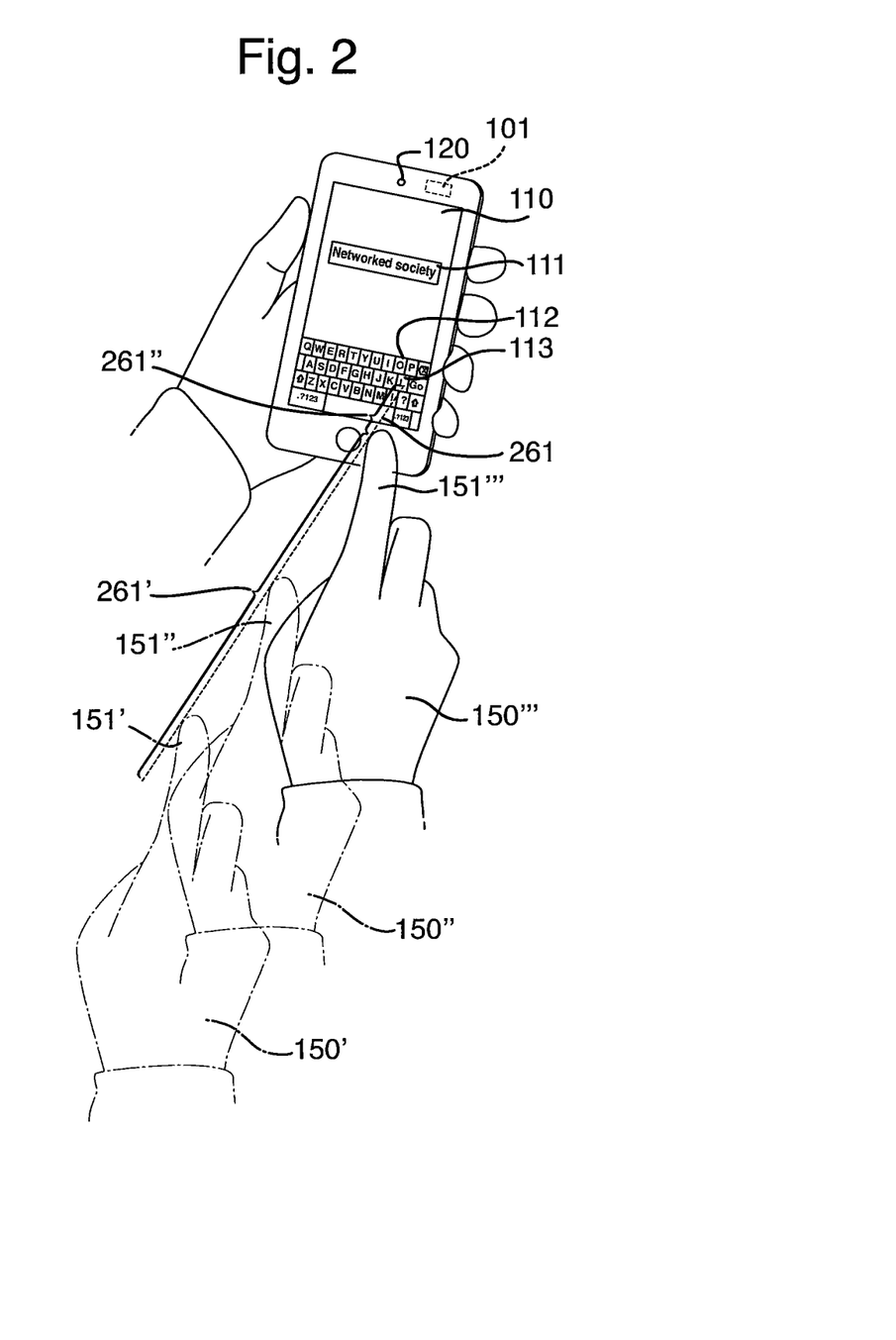
FIG. 2 illustrates determining an intended location of touch, in accordance with an embodiment of the invention.

Processing means 101 is further operative to estimate a trajectory 261 of finger 151 when approaching screen 110, as is illustrated in FIG. 2. This may be achieved by analyzing a sequence of images of reflection 163. The sequence of images is acquired from camera 110, either directly or via a buffer which device 100 is provided with. For instance, processing means 101 may be operative to request camera 120 to capture a sequence of images in response to detecting that finger 151 is about to touch screen 110, i.e., prior to the actual touch. Alternatively, processing means 101 may be operative to retrieve a past sequence of images from the buffer in response to detecting the actual touch. As yet a further alternative, processing means 101 may be operative to predict that a touch is about to take place, e.g., based on typing habits of user 130 while typing text, and acquire the sequence of images from camera 120 in response to such prediction. The sequence of images which is analyzed for estimating trajectory 261 of finger 151 may be the same sequence of images, or a different sequence of images, as the sequence of images which is analyzed for detecting that finger 151 touches or is about to touch screen 110, as is described hereinbefore.

Further with reference to FIG. 2, in order to estimate trajectory 261 processing means 101 may be operative to determine a past trajectory 261' of finger 151 and project a future trajectory 262" of finger 151 towards screen 110. Past trajectory 261' of finger 151 is determined by analyzing the sequence of images, e.g., by determining a location of finger 151, and/or a location of the fingertip of finger 151 and optionally hand 150, as a function of time. In FIG. 2, past trajectory 261' is illustrated as being determined based on the respective location of finger 151 at three different points in time, visualized by fingers 151', 151", and 151''', as well as hands 150', 150", and 150''', respectively.

It will be appreciated that determining past trajectory 261' made be achieved by utilizing known techniques of image processing. More specifically, for each image of the sequence of images at least one eye 160 of user 130 is detected and a cornea 162 is identified. Subsequently, reflection 163 of screen 110 is detected, e.g., based on the shape and visual appearance of screen 110, such as the number and arrangement of displayed user-interface elements. Finally, finger 151, and optionally other fingers and hand 150, are identified based on a number of characteristic biometric points related to the geometry of the human hand and/or fingers. Subsequently, the change in location of finger 151, or rather the location of the fingertip of finger 151, and optionally the change in location of other fingers and hand 150, is used to model the past motion of finger 151 towards screen 110 along past trajectory 261'. It will be appreciated that past trajectory 261' of finger 151 is determined based on timing information for the images of the sequence of images, such as time stamps for each image or time intervals between subsequent images.

Once past trajectory 261' of finger 151 has been determined, future trajectory 261" is estimated, i.e., the motion of finger 151, or the fingertip of finger 151, is extrapolated towards screen 110. This may, e.g., be achieved based on a model for trajectories of human fingers operating a device by means of a touch-based user interface, e.g., a touchscreen. Such a model may be based on observed trajectories for a single user, a group of users, or a certain population, and on the anatomy of the human hand, fingers, and arm, as well as their motion. The model may be derived by analyzing, either regularly or during a learning phase, touch actions of one or more users captured by means of corneal imaging, in accordance with the techniques described herein.

Processing means 101 is further operative to determine an intended location of touch of finger 151 on screen 110. The intended location of touch is the location on screen 110, relative to a frame of reference of screen 110, which user 130 intended to touch. It is determined based on estimated trajectory 261 of finger 151, e.g., by calculating the point of interception between trajectory 261 and an outer surface of screen 110. Optionally, in case a plurality of user-interface elements is displayed on screen 110, such as virtual keyboard 112 comprising a plurality of virtual keys, processing means 101 may be further operative to determine an intended user-interface element of the plurality of user-interface elements, i.e., the user-interface element, e.g., a key 113 on virtual keyboard 112, which user 130 intended to touch. The intended user-interface element is determined based on the intended location of touch. In practice, this is the user-interface element which has a surface area, e.g., defined by the circumference of a key of virtual keyboard 112, which is closest to the intended location of touch.

Further optionally, processing means 101 may be operative to perform an action associated with touching the screen at the intended location of touch, such as touching/pressing a virtual button or link, moving a cursor to the intended location of touch (such as cursor 471 illustrated in FIG. 4a), executing an application, or the like. Preferably, such action is performed in response to determining the intended location of touch or the intended user-interface element.

In the following, an alternative embodiment 300 of the device is described with reference to FIG. 3. Device 300, illustrated as smartphone, is similar to device 100 and comprises processing means 301, a screen 310, and a camera 320 which has a field of view which is directed into the same direction as the viewing direction of screen 310 and which preferably is provided on the same face of device 300 as touchscreen 310. Further, device 300 is illustrated as displaying a text field 311 and a virtual keyboard 312 on screen 310.

Screen 310 is a touchscreen, e.g., a resistive touchscreen, a surface acoustic wave touchscreen, or a capacitive touchscreens, and is configured for detecting that finger 151 touches or is about to touch touchscreen 310. Accordingly, processing means 301 may detect that finger 151 touches or is about to touch touchscreen 310 by receiving an indication, such as a signal or message transmitted via a communication interface between touchscreen 310 and processing means 301, from touchscreen 310. Touchscreen 310 may be configured for sending the signal or message in response to detecting a touch, or in response to detecting that finger 151 is about to touch touchscreen 310, e.g., if a distance between finger 151 and touchscreen 310 is below a certain threshold value. For instance, if touchscreen 310 is a capacitive touchscreen, the distance between finger 151 and touchscreen 310 may be estimated based on a change in capacitance. Touchscreen 310 is further configured for determining a location 362 where finger 151 touches or is about to touch touchscreen 310, as is known in the art. In contrast to intended location of touch described with reference to FIG. 2, which is estimated based on trajectory 261 of finger 151 derived from a top-down view obtained through corneal imaging, location 362 determined by touchscreen 310 typically corresponds to a surface normal at a location of touchscreen 310 which is closest to the fingertip of finger 151. Information pertaining to location 362 determined by touchscreen 310 may be signaled from touchscreen 310 to processing means 301 via the communication interface between touchscreen 310 and processing means 301.

Figure 3:
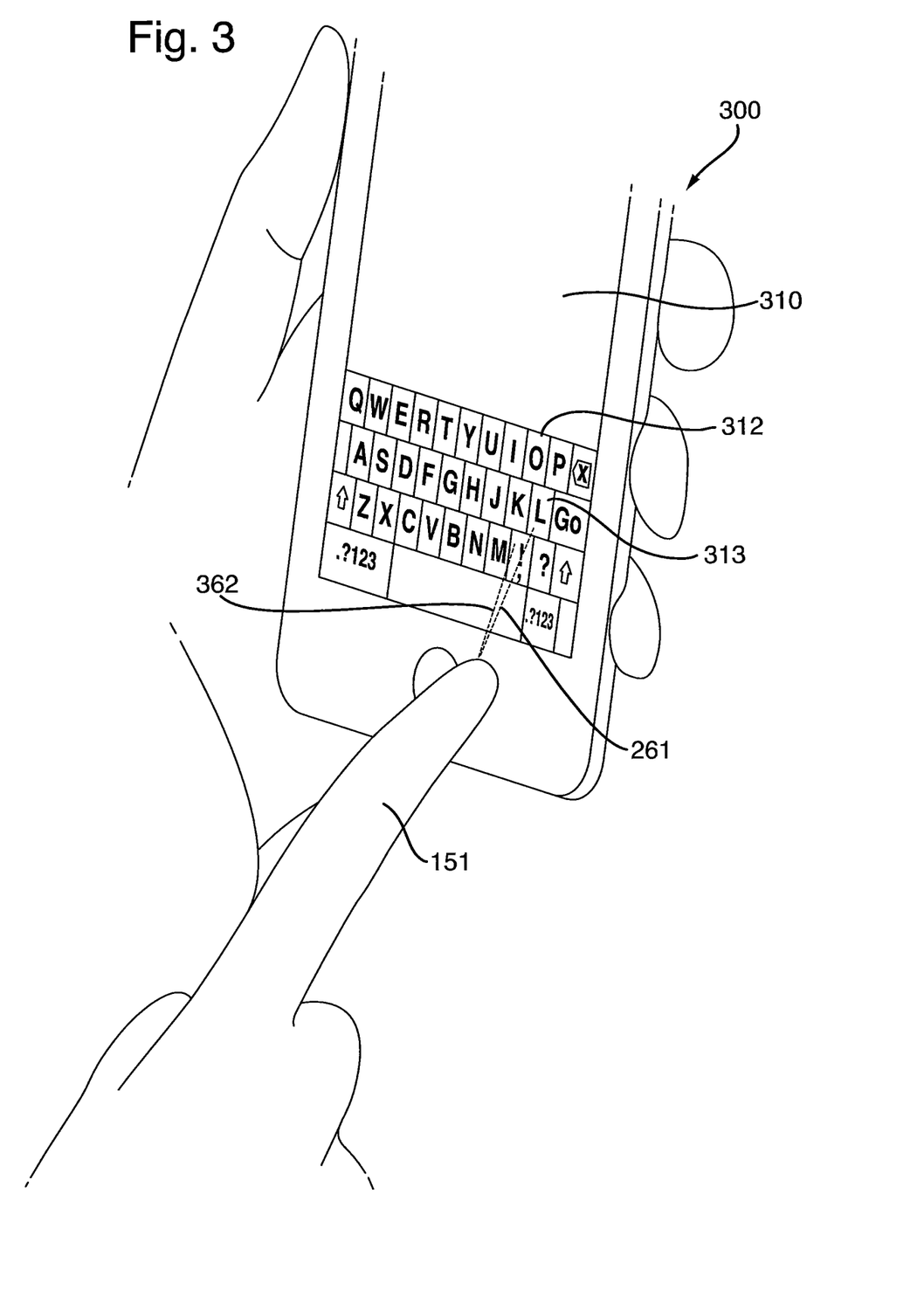
FIG. 3 illustrates determining an intended location of touch, in accordance with another embodiment of the invention.

Further with reference to FIG. 3, processing means 301 may be operative to determine the intended location of touch further based on location 362 determined by touchscreen 310. In other words, the intended location of touch is determined based on estimated trajectory 261 of finger 151 in combination with location 362 determined by touchscreen 362. Thereby, a more accurate, intended location of touch is obtained. This is advantageous because user-interface elements, such as keys on a virtual keyboard 312, text in text field 311, or links on a homepage, may be rather small in relation to the touching finger 151.

For instance, the intended location of touch may be determined as the midpoint between the location at which trajectory 261 intercepts touchscreen 310 and location 362 determined by touchscreen 310. Alternatively, one may envisage embodiments of the invention which assign different weights to the two distinct locations, i.e., the location of interception between trajectory 261 and touchscreen 310, and location 362 determined by touchscreen 310, and which calculate an intended location of touch based on both locations, taking into account the respective weight factor. Such weight factors may either be configurable by a user of device 300, set by a manufacturer of device 300 based on a population, or adapted during usage of device 300 based on learned trajectories and typing actions, in accordance with what is described hereinbefore.

Similar to device 100, processing means 301 may further be operative to determine an intended user-interface element of the plurality of user-interface elements, e.g., a key 313 on virtual keyboard 312. The intended user-interface element may be determined based on the intended location of touch and is the user-interface element which user 130 intended to touch. In contrast to device 100, device 300 may be operative determine the intended user-interface element based on both the location of interception between trajectory 261 and touchscreen 310, and location 362 determined by touchscreen 310.

In the following, with reference to FIGS. 4*a* to 4*d*, embodiments of the invention are described which are operative to modify one or more of a plurality of displayed user-interface elements which is/are close to the intended location of touch.

Device 400, illustrated as smartphone, is similar to devices 100 and 300 in that it comprises processing means 401, a screen 410, and a camera 420 which has a field of view which is directed into the same direction as the viewing direction of screen 410 and which preferably is provided on the same face of device 400 as screen 410. Screen 410 may either be a screen of non-touchscreen type, such as screen 110, or a touchscreen, such as touchscreen 310 described with reference to FIG. 3. Further, device 400 is illustrated as displaying a text field 411 and a virtual keyboard 412 on screen 410. Processing means 401 is operative to perform in accordance with what is described hereinbefore.

With reference to FIGS. 4*a* to 4*d*, processing means 401 is further operative to modify one or more of the displayed user-interface elements in response to detecting that finger 151 touches or is about to touch the screen 410. The one or more modified user-interface elements is/are close to the intended location of touch, in FIGS. 4*a* to 4*d* illustrated as the location of interception between trajectory 261 and screen 410, but may optionally be determined further based on a location of touch determined by screen 410, e.g., if screen 410 is a touchscreen. The one or more modified user-interface elements may in particular be the intended user-interface element which is determined in accordance with what is described hereinbefore.

Figure 4A:
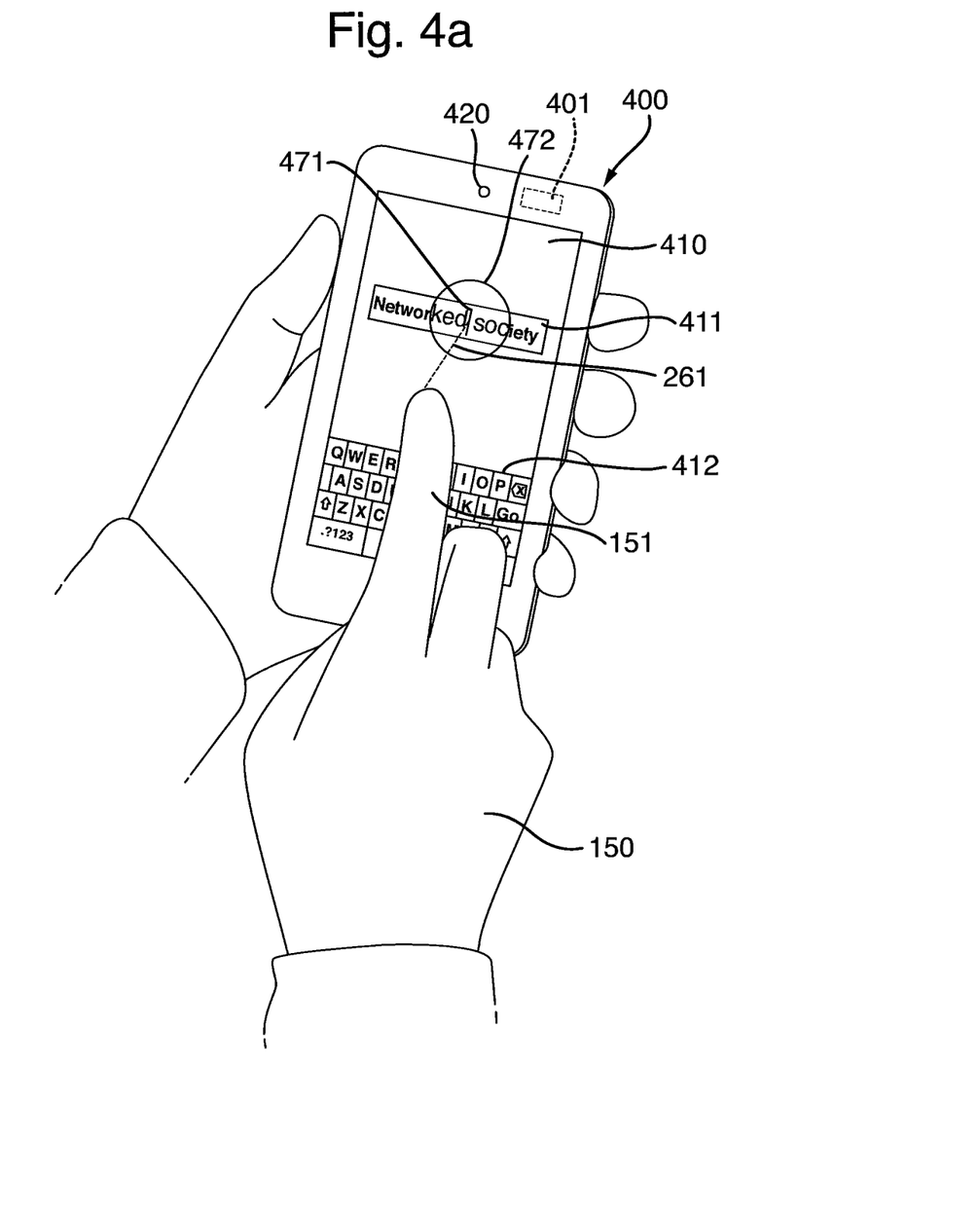
FIGS. 4a-4d illustrate modifying one or more user-interface elements, in accordance with embodiments of the invention.

As an example, processing means 401 may be operative to modify the one or more user-interface elements by magnifying the one or more user-interface elements, as is illustrated in FIG. 4*a*. This may be achieved by applying a visual effect corresponding to that of a magnifying glass 472 at the intended location of touch, here illustrated together with a cursor 471 displayed at the intended location of touch in text field 411. Thereby, editing or entering text is facilitated in that the user is provided with visual feedback when selecting the position 471 at which he/she intends to edit or enter text.

Figure 4B:
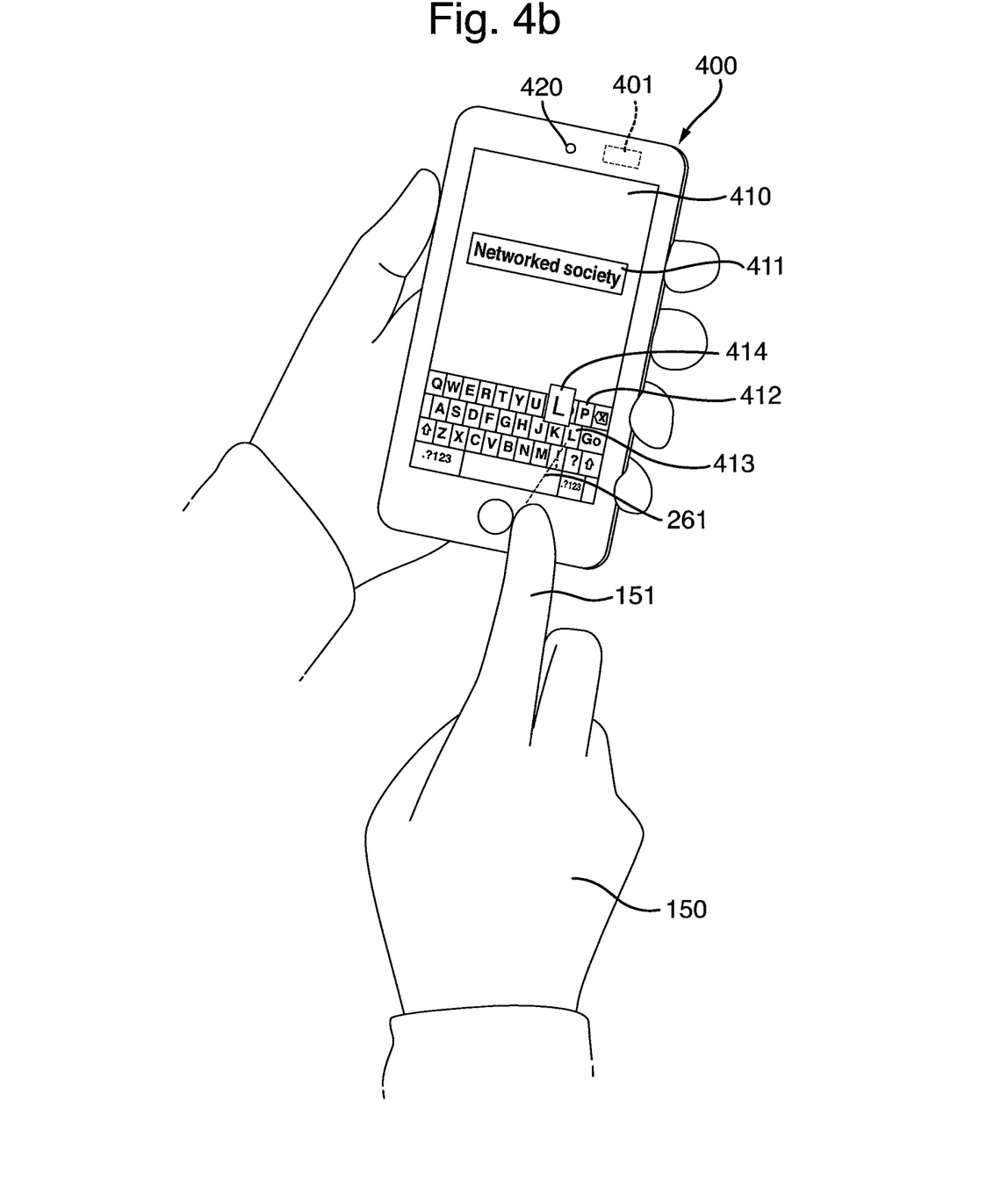

Alternatively, processing means 401 may be operative to modify the one or more user-interface elements by magnifying 414 the intended user-interface element, such as a key 413 of virtual keyboard 412, as is shown in FIG. 4*b*. This is advantageous in that the user is provided with visual feedback while typing, thereby mitigating the risk of hitting the wrong key on virtual keyboard 412.

Figure 4C:
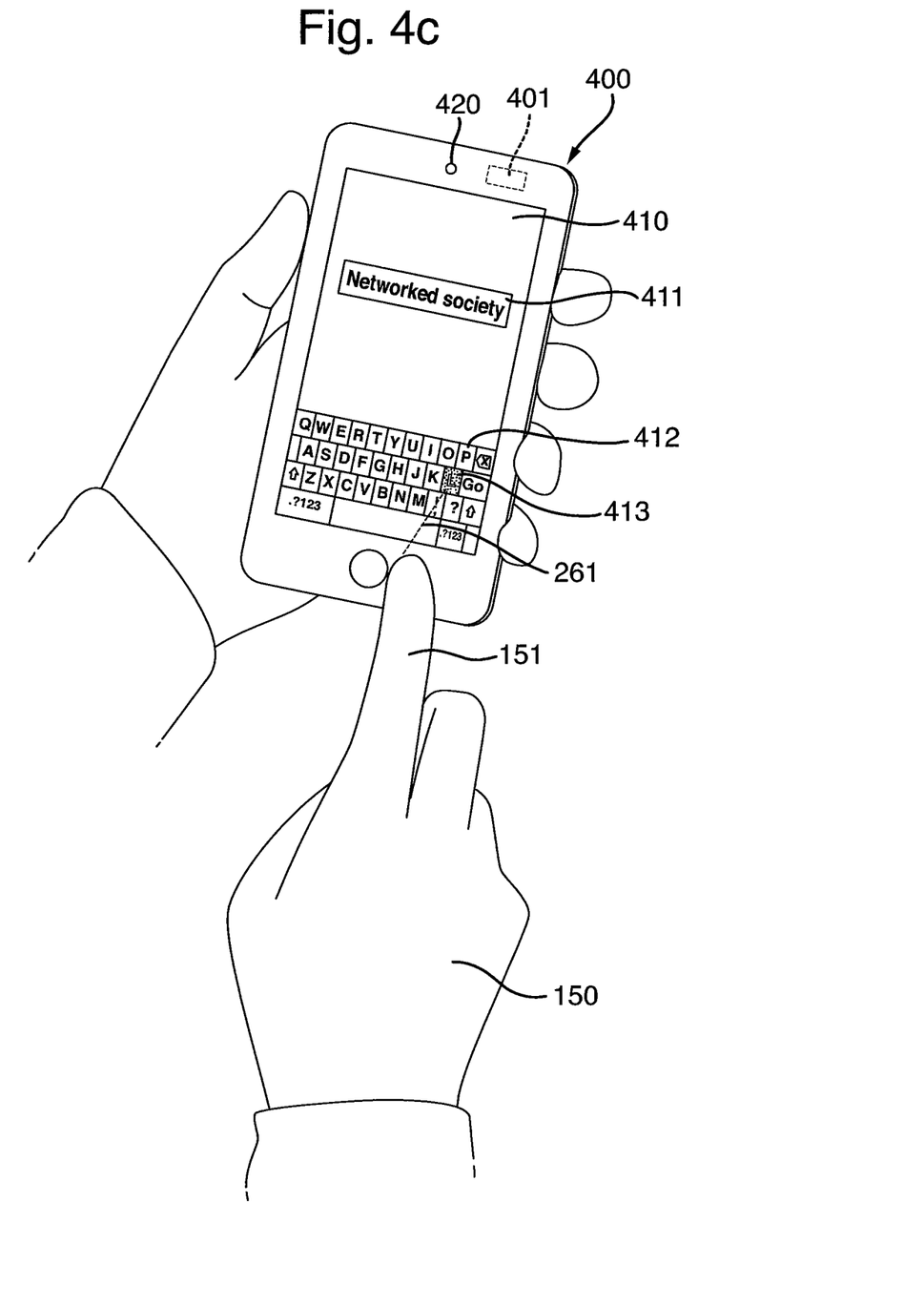

As yet a further alternative, processing means 401 may be operative to modify the one or more user-interface elements by changing a visual appearance of the one or more user-interface elements, such as changing the background of key 413, as is illustrated in FIG. 4*c*. Changing the visual appearance may alternatively be accomplished by changing a color of a user-interface element or a part of a user-interface element, such as using a colored font for a few characters in a text string, or by displaying a user-interface element in an animated manner.

Figure 4D:
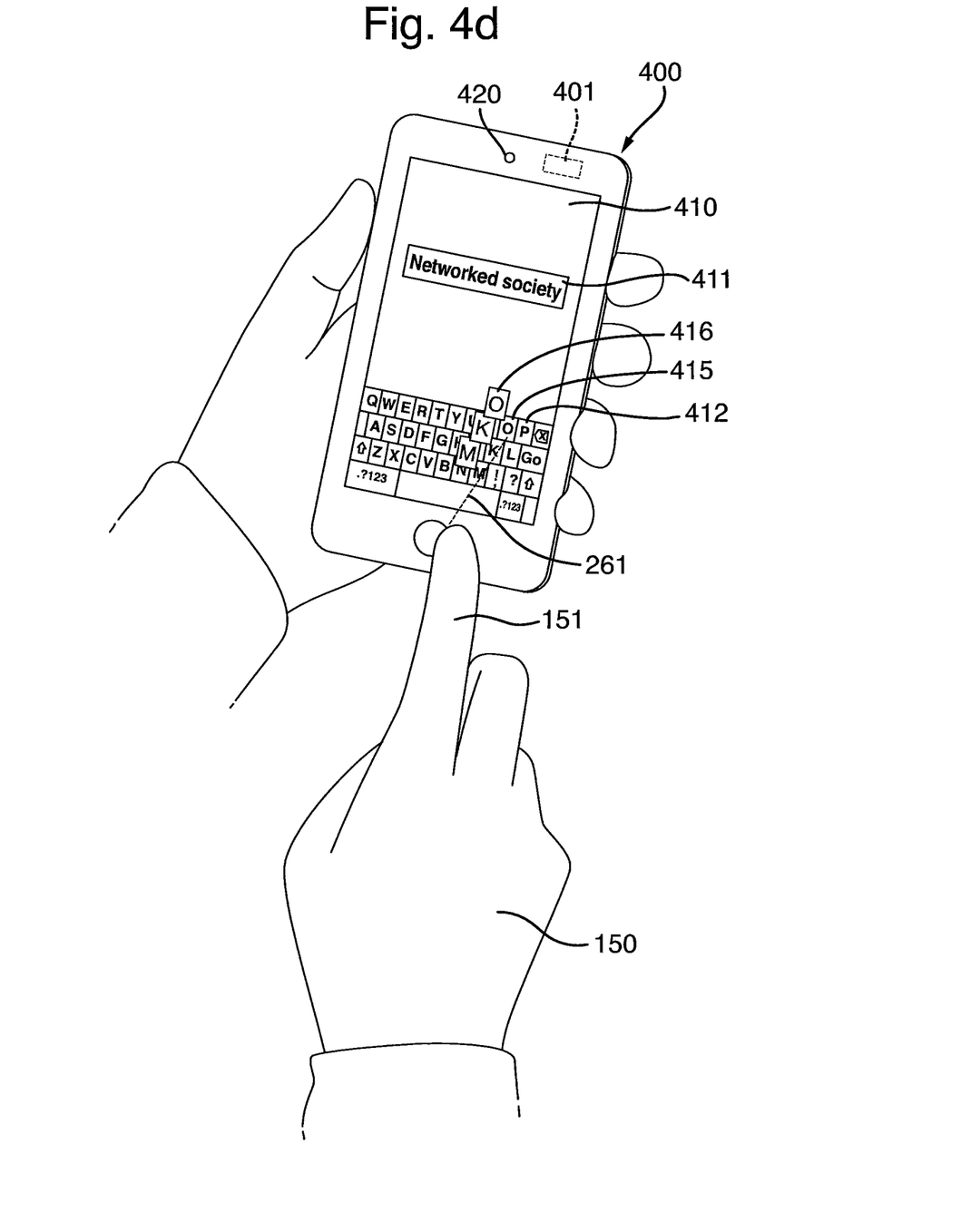

In FIG. 4*d*, yet another alternative for modifying one or more user-interface elements is illustrated. More specifically, processing means 401 may be operative to modify one or more of the displayed user-interface elements, such as keys 415 ("M", "K", and "O") of virtual keyboard 412, in response to detecting that finger 151 is about to touch screen 410, wherein the modified user-interface elements 415 are close to estimated trajectory 261. In other words, those user-interface elements which are along estimated trajectory 261 are modified, e.g., magnified 416 as is illustrated in FIG. 4*d*. Thereby, visual feedback is provided to the user, illustrating which of the displayed user-interface elements are along estimated trajectory 261 and accordingly most likely to be touched by finger 151. Based on this visual feedback the user may correct the trajectory of finger 151 and touch one of the magnified 416 user-interface elements.

In addition to what is described hereinbefore, embodiments of the invention may also utilize the top-down-view obtained through corneal imaging for improving text correction functionality, such as Autocorrect, replace-as-you-type, or text replacement, which frequently is provided with touchscreen-based devices in order to mitigate the difficulties which users have in selecting the correct key. Such text correction functionality typically suggests complete words by determining one or more words which have the largest likelihood, based on the letters which have been typed so far and a dictionary of words, of being the word which the user intended to type. According to an embodiment of the invention, such text correction functionality for entering and editing text may be enhanced by taking into account estimated trajectory 261 of finger 151 and/or the intended location of touch, in addition to suggesting one or more likely words from a dictionary. For instance, estimated trajectory 261 and/or the intended location of touch may be used in a weighted fashion as input to a text correction algorithm.

It will be appreciated that embodiments of the invention may comprise different means for implementing the features described hereinbefore, and that these features may in some cases be implemented according to a number of alternatives. For instance, displaying a text field and a virtual keyboard may, e.g., be performed by the processing means, presumably executing an operating system of the device, in cooperation with the screen. Further, acquiring a sequence of images of a reflection of the screen may, e.g., be performed by the processing means in cooperation with the camera. Finally, estimating a trajectory of the finger and determining an intended location of touch of the finger on the screen is preferably performed by the processing means.

Figure 5:
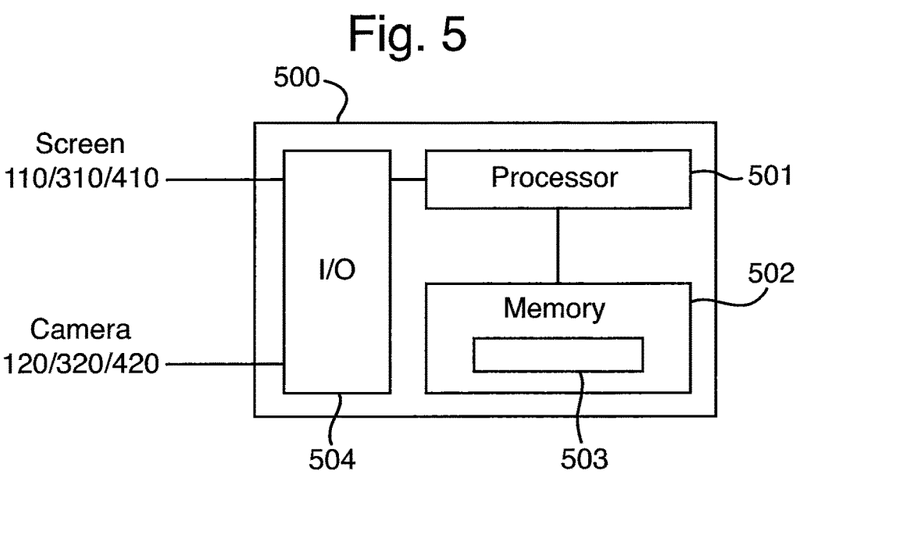
FIG. 5 shows a processing unit of a device for providing a touch-based user interface, in accordance with an embodiment of the invention.

In FIG. 5, an embodiment 500 of processing means 101, 301, and 401, is shown. Processing means 500 comprises a processor 501, e.g., a general purpose processor or a Digital Signal Processor (DPS), a memory 502 containing instructions, i.e., a computer program 503, and one or more interfaces 504 ("I/O" in FIG. 5) for receiving information from, and controlling, screen 110, 310, or 410, and camera 120, 320, or 420, respectively. Computer program 503 is executable by processor 501, whereby device 100, 300, or 400, is operative to perform in accordance with embodiments of the invention, as described hereinbefore with reference to FIGS. 1 to 4.

Figure 6:
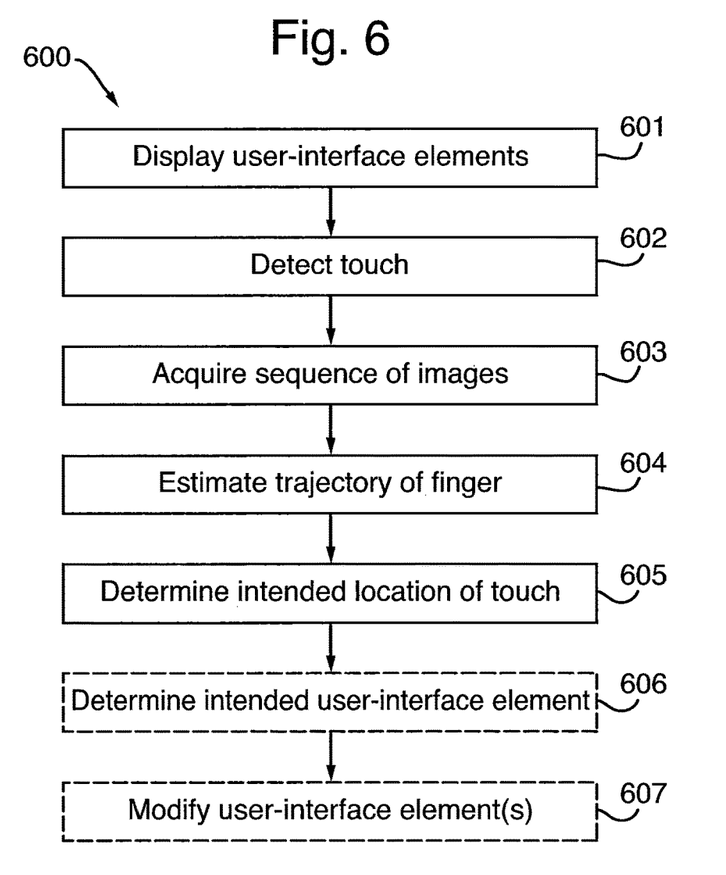
FIG. 6 shows a method of providing a touch-based user interface, in accordance with an embodiment of the invention.

In FIG. 6, a flowchart illustrating an embodiment 600 of the method of providing a touch-based use interface is shown. Method 600 comprises displaying 601 at least one user-interface element on a screen, detecting 602 that a finger of a hand touches or is about to touch the screen, estimating 604, by analyzing an acquired 603 sequence of images of a reflection of the screen by a cornea of a user, a trajectory of the finger, and determining 605 an intended location of touch of the finger on the screen based on the estimated trajectory of the finger. Optionally, estimating 604 the trajectory of the finger may comprise determining a past trajectory of the finger by analyzing the sequence of images, and projecting a future trajectory of the finger towards the screen based on the determined past trajectory of the finger.

According to an alternative embodiment of the invention, method 600 may further comprise continuously acquiring 603 images of the reflection and detecting 602 that the finger touches or is about to touch the screen by analyzing the images. Accordingly, steps 602 and 603 in FIG. 6 may be interchanged. According to another alternative embodiment of the invention, the screen is a touchscreen which is configured for detecting 602 that the finger touches or is about to touch the touchscreen, and determining a location where the finger touches or is about to touch the touchscreen. In this case, the intended location of touch is determined 605 further based on the location determined by the touchscreen.

Optionally, method 600 may further comprise determining 606, based on the intended location of touch, an intended user-interface element of a plurality of displayed user-interface elements. Further optionally, method 600 may further comprise modifying 607 one or more or the at least one user-interface element which is/are close to the intended location of touch, in particular the intended user-interface element, or close to the estimated trajectory. This may, e.g., be achieved by magnifying the one or more user-interface elements or changing a visual appearance of the one or more user-interface elements. Further optionally, method 600 may further comprise, in response to determining the intended location of touch and/or the intended user-interface element, performing an action associated with touching the screen at the intended location of touch.

It will be appreciated that method 600 may comprise additional or modified steps in accordance with what is described hereinbefore. An embodiment of method 600 may be implemented as software, such as computer program 503, to be executed by a processor comprised in the device (such as processor 501 described with reference to FIG. 5), whereby the device is operative to perform in accordance with embodiments of the invention.

Figure 7:
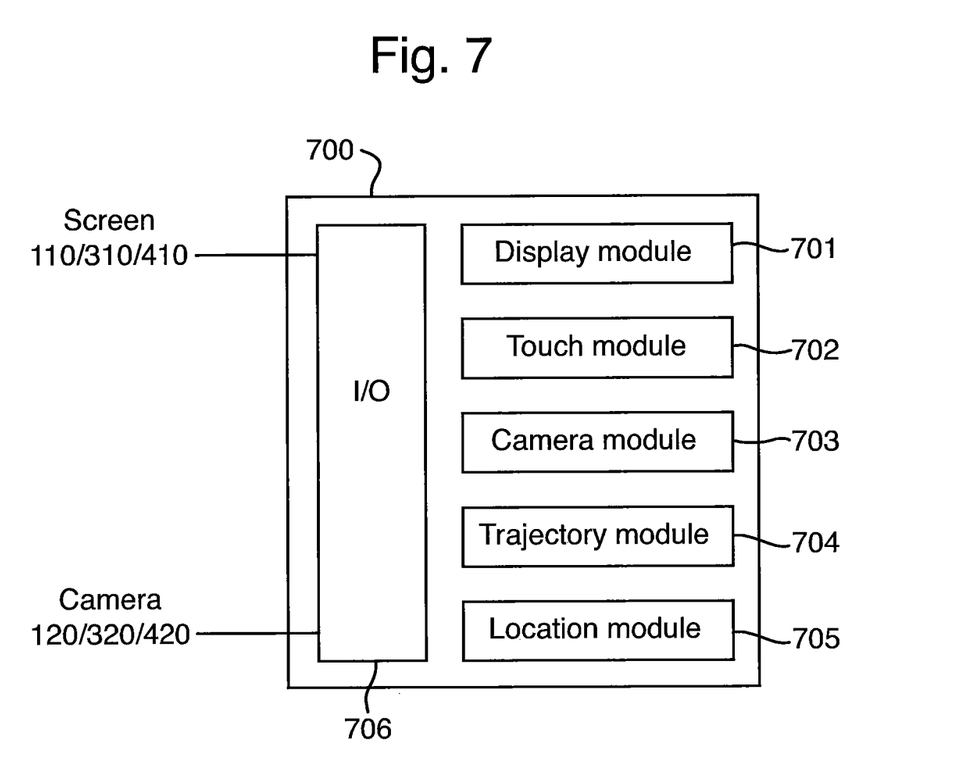
FIG. 7 shows a processing unit of a device for providing a touch-based user interface, in accordance with another embodiment of the invention.

In FIG. 7, an alternative embodiment 700 of processing means 101, 301, and 401, is shown. Processing means 700 comprises one or more interface modules 706 ("I/O" in FIG. 7) for receiving information from, and controlling, screen 110, 310, or 410, and camera 120, 320, and 420, respectively. Processing means 700 further comprises a display module 701 for displaying at least one user-interface element on the screen, a touch module 702 for detecting that a finger of a hand touches or is about to touch the screen, a camera module 703 for acquiring a sequence of images from the camera, a trajectory module 704 for estimating, by analyzing a sequence of images of the reflection, a trajectory of the finger, and a location module 705 for determining an intended location of touch of the finger on the screen based on the estimated trajectory of the finger.

Optionally, trajectory module 704 may be configured for estimating the trajectory of the finger by determining a past trajectory of the finger by analyzing the sequence of images, and projecting a future trajectory of the finger towards the screen based on the determined past trajectory of the finger.

Camera module 703 may be configured for continuously acquiring images of the reflection from the camera, and touch module 702 may be configured for detecting that the finger touches or is about to touch the screen by analyzing the images. Alternatively, if the screen is a touchscreen which is configured for detecting that the finger touches or is about to touch the touchscreen and determining a location where the finger touches or is about to touch the touchscreen, location module 705 may be configured for determining the intended location of touch further based on the location determined by the touchscreen.

Location module 705 may further be configured for determining an intended user-interface element of a plurality of displayed user-interface elements, based on the intended location of touch.

Optionally, display module 701 may be configured for modifying, in response to detecting that the finger touches or is about to touch the screen, one or more of the at least one user-interface element which is/are close to the intended location of touch, in particular the intended user-interface element. As an alternative, display module 701 may be configured for modifying, in response to detecting that the finger is about to touch the screen, one or more of the at least one user-interface element which is/are close to the estimated trajectory. For instance, the one or more user-interface elements may be modified by magnifying the one or more user-interface elements. Alternatively, the one or more user-interface elements may be modified by changing a visual appearance of the one or more user-interface elements.

Processing means 700 may comprise additional modules for implementing additional or modified features in accordance with embodiments of the invention. For instance, processing means 700 may comprise an action module for performing an action associated with touching the screen at the intended location of touch.

It will be appreciated that modules 701-706, and any additional modules comprised in processing means 700, may be implemented by any kind of electronic circuitry, e.g., any one or a combination of analogue electronic circuitry, digital electronic circuitry, and processing means executing a suitable computer program.

Even though embodiments of the invention are hereinbefore described as smartphones, such as devices 100, 300, and 400, it will be appreciated that the invention may be embodied in any type of device having a touch-based user interface, in particular devices comprising touchscreens, such as tablets, mobile terminals, User Equipments (UEs), or the like, but also built-in displays of a type which is frequently found in cars or vending machines.

The person skilled in the art realizes that the invention by no means is limited to the embodiments described above. On the contrary, many modifications and variations are possible within the scope of the appended claims. For instance, the intended location of touch may be determined further based on readings from accelerometers and/or gyroscopes which devise such as smartphones and tablets commonly are provided with.

The invention claimed is:

1. A method providing a touch based user interface for a user of an electronic device, the electronic device comprising a touchscreen and a camera, the method comprising:
 displaying a plurality of user-interface elements on the touchscreen;
 estimating a trajectory of a finger of the user of the electronic device based on an analysis of a sequence of images, each image of the sequence comprising a reflection of the finger and the touchscreen on a cornea of an eye of the user, wherein the sequence of the images are provided by the camera of the electronic device;
 detecting that the finger of the user is less than a threshold distance from the touchscreen based on the analysis of the sequence of the images of the reflection; and
 determining an estimated location that the finger of the user will touch on the touchscreen based on estimating the trajectory of the finger of the user in response to the detecting that the finger of the user is less than the threshold distance from the touchscreen.

2. The method of claim 1 further comprising:
 selectively modifying at least one of the plurality of user-interface elements on the touchscreen responsive to determining the estimated location that the finger of the user will touch on the touchscreen.

3. The method of claim 2 wherein the at least one of the plurality of user-interface elements corresponds to the estimated location that the finger of the user will touch on the touchscreen.

4. The method of claim 2 wherein the selectively modifying comprises selectively magnifying the at least one of the plurality of user-interface elements on the touchscreen responsive to the determining the estimated location that the finger of the user will touch on the touchscreen.

5. The method of claim 2 wherein the selectively modifying comprises selectively changing a visual appearance of the at least one of the plurality of user-interface elements on the touchscreen responsive to the determining the estimated location that the finger of the user will touch on the touchscreen.

6. An electronic device comprising:
 a camera;
 a touchscreen; and
 a processor coupled with the camera and the touchscreen, wherein the processor is configured to:
 display a plurality of user-interface elements on the touchscreen;
 estimate a trajectory of a finger of a user of the electronic device based on an analysis of a sequence of images, each image of the sequence comprising a reflection of the finger and the touchscreen on a cornea of an eye of the user, wherein the sequence of the images are provided by the camera of the electronic device;
 detect that the finger of the user is less than a threshold distance from the touchscreen based on the analysis of the sequence of the images of the reflection; and
 determine an estimated location that the finger of the user will touch on the touchscreen based on estimating the trajectory of the finger of the user in response to the detection that the finger of the user is less than the threshold distance from the touchscreen.

7. The electronic device of claim 6, wherein the processor is further configured to:
 selectively modify at least one of the plurality of user-interface elements on the touchscreen responsive to determining the estimated location that the finger of the user will touch on the touchscreen.

8. The electronic device of claim 7 wherein the at least one of the plurality of user-interface elements corresponds to the estimated location that the finger of the user will touch on the touchscreen.

9. The electronic device of claim 7 wherein the processor is further configured to selectively modify the at least one of the plurality of user-interface elements on the touchscreen by selectively magnifying the at least one of the plurality of user-interface elements on the touchscreen responsive to determining the estimated location that the finger of the user will touch on the touchscreen.

10. The electronic device of claim 7 wherein the processor is further configured to selectively modify the at least one of the plurality of user-interface elements on the touchscreen by changing a visual appearance of the at least one of the plurality of user-interface elements on the touchscreen responsive to determining the estimated location that the finger of the user will touch on the touchscreen.

* * * * *

UNITED STATES PATENT AND TRADEMARK OFFICE
CERTIFICATE OF CORRECTION

PATENT NO. : 10,620,748 B2
APPLICATION NO. : 14/655865
DATED : April 14, 2020
INVENTOR(S) : Nolan et al.

It is certified that error appears in the above-identified patent and that said Letters Patent is hereby corrected as shown below:

In the Specification

In Column 6, Line 61, delete "camera 110," and insert -- camera 120, --, therefor.

In Column 8, Lines 62-63, delete "touchscreen 362." and insert -- touchscreen 310. --, therefor.

In Column 8, Line 63, delete "accurate," and insert -- accurate --, therefor.

Signed and Sealed this
Fourth Day of August, 2020

Andrei Iancu
*Director of the United States Patent and Trademark Office*